United States Patent [19]
Kringlebotn

[11] Patent Number: 5,844,927
[45] Date of Patent: Dec. 1, 1998

[54] OPTICAL FIBER DISTRIBUTED FEEDBACK LASER

[75] Inventor: Jon Thomas Kringlebotn, Trondheim, Norway

[73] Assignee: Optoplan AS, Trondheim, Norway

[21] Appl. No.: 618,789

[22] Filed: Mar. 20, 1996

[30] Foreign Application Priority Data

Mar. 20, 1995 [NO] Norway .................................... 951052

[51] Int. Cl.[6] ................................................ H01S 3/30
[52] U.S. Cl. .................................... 372/6; 372/96; 385/12
[58] Field of Search ................................ 372/6, 96, 102; 385/12, 13

[56] References Cited

U.S. PATENT DOCUMENTS

| | | | |
|---|---|---|---|
| 5,091,983 | 2/1992 | Lukosz | 385/13 |
| 5,295,209 | 3/1994 | Huber | 372/6 |
| 5,305,335 | 4/1994 | Ball et al. | 372/6 |
| 5,394,488 | 2/1995 | Fernald et al. | 385/13 |
| 5,488,475 | 1/1996 | Friebele et al. | 372/6 |
| 5,511,083 | 4/1996 | D'Amato et al. | 372/6 |
| 5,623,565 | 4/1997 | Blair et al. | 385/24 |

*Primary Examiner*—Rodney B. Bovernick
*Assistant Examiner*—Robert E. Wise
*Attorney, Agent, or Firm*—Dennison, Meserole, Pollack & Scheiner

[57] ABSTRACT

An optical end-pumped fiber laser doped with one or more rare-earths and with distributed feedback (DFB) via a fiber Bragg-grating, which is oscillating on two orthogonally polarized wavelengths. The distance between the wavelengths may be tuned by changing the birefringence of the fiber. The laser may be applied as a polarimetric sensor in which an asymmetrical force changes the wavelength separation, or as a tunable two-wavelength source. A particular preferred field of application is for measuring the pressure in pipes, to determine the flow.

23 Claims, 5 Drawing Sheets

OPTICAL FIBER DISTRIBUTED FEEDBACK LASER

BACKGROUND OF THE INVENTION

This invention relates to an optical end-pumped fibre laser, doped with one or more rare earth ions and with distributed feedback provided by one single fibre Bragg grating, which oscillates at two orthogonally polarised wavelengths.

A patent application for a rare-earth doped fibre laser with distributed feedback (fibre DFB laser) was recently filed [UK Patent Application No. 9409033.9, filed 6 May 1994, and PCT/GB95/01026], and experimental results are later published [J. T. Kringlebotn, J. L. Archambault, L. Reekie, D. N. Payne, "$Er^{3+}$:$Yb^{3+}$-codoped fibre distributed-feedback laser," Optics Letters, Vol. 19, pp. 2101–2103, 1994]. When end-pumped by an optical source (typically a semiconductor laser) such a fibre DFB laser will, with an optical phase-shift of $\pi$ in the fibre Bragg grating, oscillate at two orthogonally polarised wavelengths only (see Kringlebotn et. al. 1994). These two (Bragg) wavelengths are given by:

$$\lambda_{Bx} = 2n_x \Lambda \tag{1a}$$

and $$\lambda_{By} = 2n_y \Lambda \tag{1b}$$

where $n_x$ and $n_y$ are the effective refractive indices of the two orthogonal polarisation eigenstates x and y of the fibre laser, and L is the physical period (pitch) of the fibre Bragg grating. The wavelength separation $\Delta\lambda = \lambda_{Bx} - \lambda_{By}$, is given by:

$$\Delta\lambda + 2B\Lambda \tag{2}$$

where the birefringence B of the fibre is defined as $B = n_x - n_y$.

A change in the birefringence B and/or the grating pitch, i.e. the fibre length, results in a change in $\Delta\lambda$, $d(\Delta\lambda)$, such that $$\frac{\delta(\Delta\lambda)}{\Delta\lambda} = \frac{\delta B}{B} + \epsilon \tag{3}$$

where $\epsilon = \delta\Lambda/\Lambda = \delta L/L$ is the fibre strain. L is the length of the fibre laser. It is known that the birefringence of an optical fibre can be changed by squeezing, bending or twisting the fibre.

Several fibre optic sensors based on so-called DBR (distributed Bragg-reflector) fibre lasers with two fibre Bragg grating end-reflectors, or one grating and one broad-band mirror, have been demonstrated [A. D. Kersey, K. P. Koo, and M. A. Davis, "Fiber optic Bragg grating laser sensors," Proceedings SPIE, Vol. 2292, 1994]. This was done either by using the lasers for wavelength interrogation of passive fibre Bragg grating sensors, or by employing the lasers as the sensor elements themselves. In all these sensors one measures the Bragg wavelength of one or more fibre grating sensors, and the sensors have the advantage (over passive grating sensors interrogated by broadband sources) that all optical power is concentrated within the grating band-width (with a signal bandwidth potentially much narrower than the grating bandwidth), such that the sensor system can provide high, optically limited, signal-to-noise ratios. By employing the fibre laser itself as the sensor element (remotely pumped by a semiconductor laser), the emitted laser wavelength will be proportional to the measurand, and the need for a tuneable interrogation laser is eliminated. This enables very high resolution, a fast response, and enables wavelength multiplexing of many sensors. Such a fibre Bragg grating laser sensor can either be operated in multiple mode (laser length L>>5 cm), where the optical signal band-width is limited by the grating band-width (10–100 GHz), or in single mode (L<5 cm), where the linewidth is typically 1–500 kHz. This implies that single mode operation provides the highest resolution.

In all these sensors the wavelength(s) of one or more fibre Bragg gratings are measured, which requires a system for accurate readout of the wavelength(s). This can often be difficult to realise (for a required accuracy). A different, simple and elegant approach, based on a dual wavelength DBR fibre laser with two fibre Bragg grating end-reflectors, was recently demonstrated [G. A. Ball, G. Meltz, and W. W. Morey, "Polarimetric heterodyning Bragg-grating fiber-laser sensor", Optics Letters, Vol. 18, pp. 1976–1978, 1993]. In this laser sensor the separation between the two fibre Bragg gratings was small (<5 cm), such that the number of oscillating longitudinal modes were reduced to two orthogonally polarised wavelengths (which belonged to neighbouring longitudinal orders).

In this dual-mode DBR fibre laser sensor the wavelength separation is measured, which in addition to the laser length and fibre birefringence, depends on the relative phase of the two wavelengths upon reflection for the two grating end-reflectors, and also on the longitudinal order of each of the polarisation modes. By sending the laser light through a polariser the two wavelengths can mix in a detector and generate an electrical beat signal with frequency equal to the optical frequency separation between the two wavelengths (typically 0.5–50 GHz). Hence, a very simple, accurate and fast electronic readout of the separation, and hence the measurand which affects the fibre laser, is obtained. The optical linewidth of each of the two modes in the DBR laser demonstrated by Ball et.al. was very narrow (a factor $10^{-7}$ to $10^{-3}$) compared to the wavelength separation. Hence a sensor based on such a laser will have a very high resolution and a wide dynamic range.

The DBR fibre laser reported by Ball et. al. was used as a strain sensor, i.e. the wavelength separation was changed by applying a strain to the fibre laser (the two gratings and the doped fibre in-between), but it was mentioned that all perturbations which change the cavity length or the birefringence will give rise to a change in wavelength separation, and hence beat frequency.

The problem with this dual polarisation mode DBR fibre laser sensor (and single mode DBR fibre laser based on measuring the wavelength) is that it consists of two separate fibre gratings and a fibre section in-between, which need to be exposed equally to and have the same response to the measurand to obtain a correct measurement and avoid mode hopping (uncontrolled shifts of longitudinal mode) or ceasing of laser action. The two gratings should also have the same Bragg wavelength and birefringence.

A central problem of all fibre optic sensors, including sensors based on fibre Bragg gratings, is to separation between two measurands, for instance pressure and temperature, or strain and temperature. Fibre Bragg grating sensors are, as mentioned above, normally based on measuring induced shifts in Bragg wavelength. Since (for instance) pressure, strain and temperature variations induce shifts in Bragg wavelength will not be a measurement of the reflected Bragg wavelength from a sensor grating separate between two different measurands. A series of methods have been proposed to solve this problem, for instance by using two gratings with different responses to one (or both) of the measurands, or by employing two overlapping gratings with different Bragg wavelengths, and hence different responses, but so far this problem has not been satisfactorily solved with only one fibre Bragg grating.

In various interferometric fibre optic sensors it is desirable to use two sources with different wavelengths and tuneable wavelength separation, or ideally one source with two wavelengths and tuneable wavelength separation, (for instance) to ensure so-called quadrature operation at all times, or alternatively to increase the linear (unambiguous) measuring range. It is also known that two stable wavelengths can be employed for the generation of a beat signal which through non-linear propagation in a dispersion profiled fibre will develop into a pulse train with tuneable (and stable) pulse repetition (beat) frequency equal to the optical frequency separation between the two wavelengths. This is demonstrated with two coupled fibre lasers, with four fibre Bragg gratings and two different wavelengths, in series along the same fibre [S. V. Chernikov, J. R. Taylor, and R. Kashyap, "Integrated all optical fibre source of multigigahertz soliton pulse train", Electronics Letters, Vol. 29, pp. 1788–1789, 1993].

OBJECTS OF THE INVENTION

The main object of the invention is to provide an end-pumped fibre laser which can be employed as sensor for measurement of a measurand, for instance pressure, independently of other parameters, for instance temperature, or for measurement of two independent measurands, for instance pressure and temperature.

In particular it is an object to provide a fibre optic sensor based on a fibre Bragg grating which can measure pressure, for instance in cells for flow measurements, without being effected by changes in temperature.

Another object is to provide a sensor for acoustic pressure measurements.

Another object is to obtain a means for using an end-pumped fibre laser, as mentioned above, as a source with two orthogonal wavelengths with tuneable separation between the two orthogonal wavelengths.

Addition objects for the invention will become clear from the following part of the description.

SUMMARY OF THE INVENTION

By means which primarily change the fibre birefringence B, a DFB fibre laser with tuneable/adjustable separation between the two orthogonal wavelengths can be constructed. The invention has particular use as a sensor, where the measurand (external perturbation) induces a birefringence in the fibre, for instance through an asymmetric, transverse force on the fibre, such that the measurand, for instance pressure (or differential pressure) can be determined by measuring the wavelength separation. In a preferred embodiment this is done by combining the two wavelengths in a photo detector resulting in a measurable electrical beat frequency. Notice that any measurands which introduce a change in fibre birefringence (or effective refractive index), or a change in fibre laser length, can be measured by the proposed fibre laser sensor.

When a measurand induces a birefringence in the fibre laser, another measurand, which does not (or to a small extent) induce such a birefringence, for instance temperature or strain can be measured, since in such a case the wavelength separation, which is proportional to the birefringence and the two orthogonal wavelengths, which are proportional to the refractive indices along the two orthogonal eigenaxises, will have differing dependence on the two measurands. Hence, by measuring both the wavelength separation and one of the wavelength (or by measuring both wavelength) both the two independent measurands can be determined.

The wavelength separation will also depend on the laser cavity length, which is effected by for instance temperature and strain. The sensor can, however, be constructed in such a way that changes in wavelength separation due to variations in, for instance, temperature and strain becomes small compared to changes which are caused by variations in the measurand inducing the birefringence, and which one primarily are interested in measuring. Hence, the invention employed as a sensor can to a great extent differentiate between two different measurands, for instance pressure and temperature, and hence in many cases make temperature compensation in pressure measurements (which for many other sensors are necessary) unnecessary.

The invention also concerns a DFB fibre laser source with tuneable separation between the two orthogonal wavelengths. Such a source can for instance be employed as a dual-wavelength source for interferometric fibre optic sensors, where two wavelengths with correct separation can ensure quadrature operation or alternatively increase the linear dynamic range. In particular will such a source be applicable in polarimetric interferometric sensors, since the two wavelengths have orthogonal polarisation states. The laser can also be employed as a depolarised source. The tuneable dual-wavelength DFB fibre laser can also be used for generating a beat signal which through non-linear propagation in a dispersion profiled fibre develops into a pulse train with tuneable (and potentially very stable) pulse repetition frequency equal to the frequency separation between the polarisation modes. The proposed dual-wave-length source has the advantage of requiring only one single fibre Bragg grating.

BRIEF DESCRIPTION OF THE INVENTION

Figure 2A:
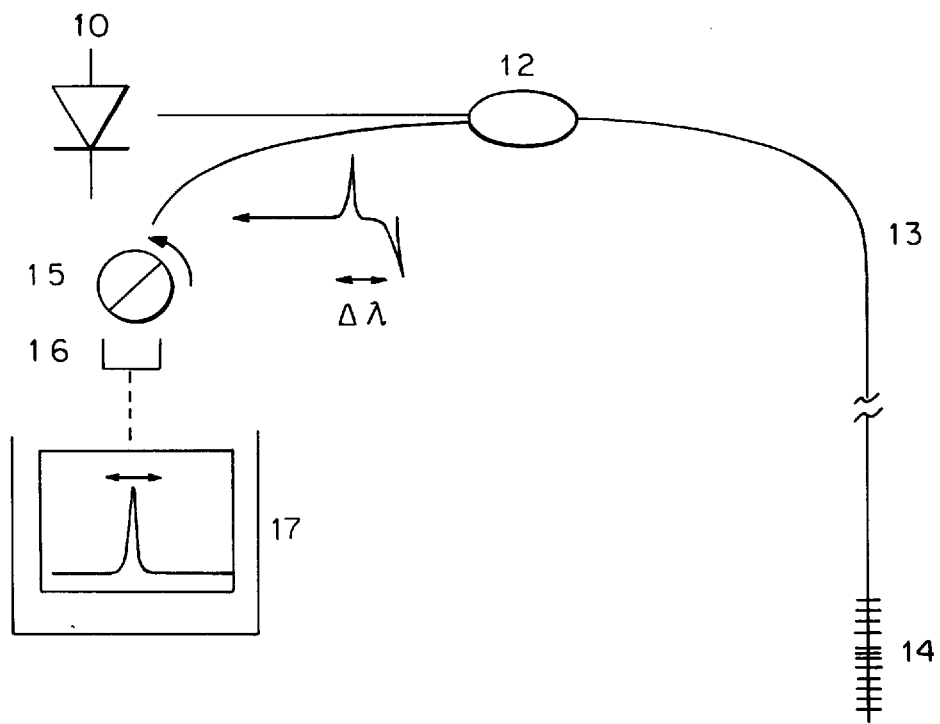
Figure 2B:
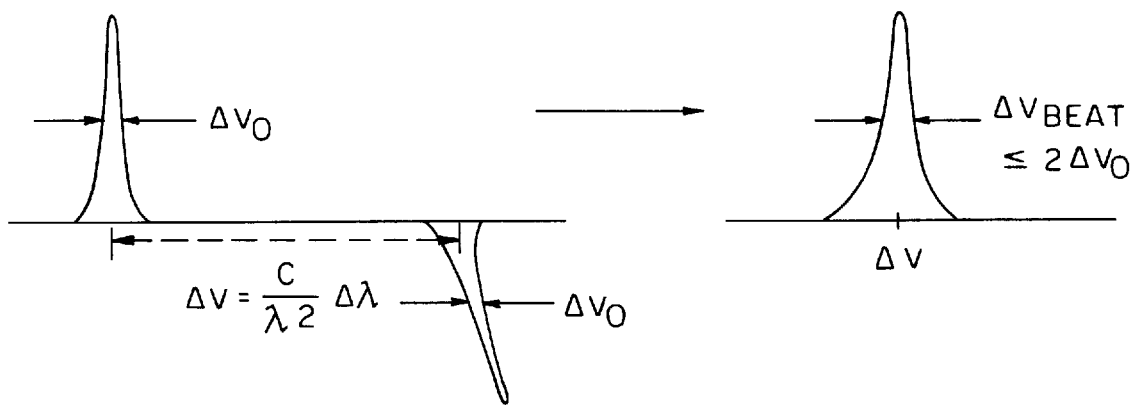
Figure 3A:
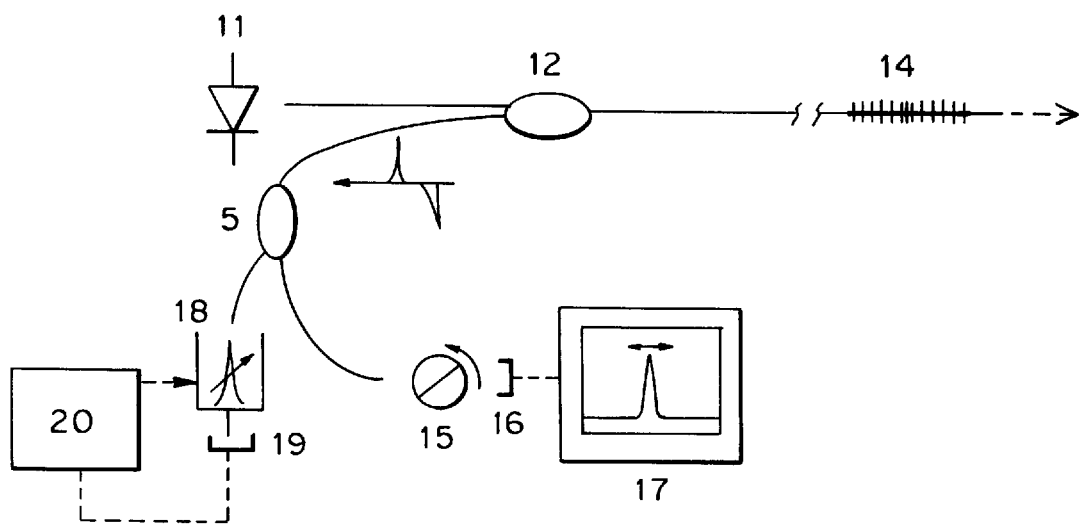
Figure 3B:
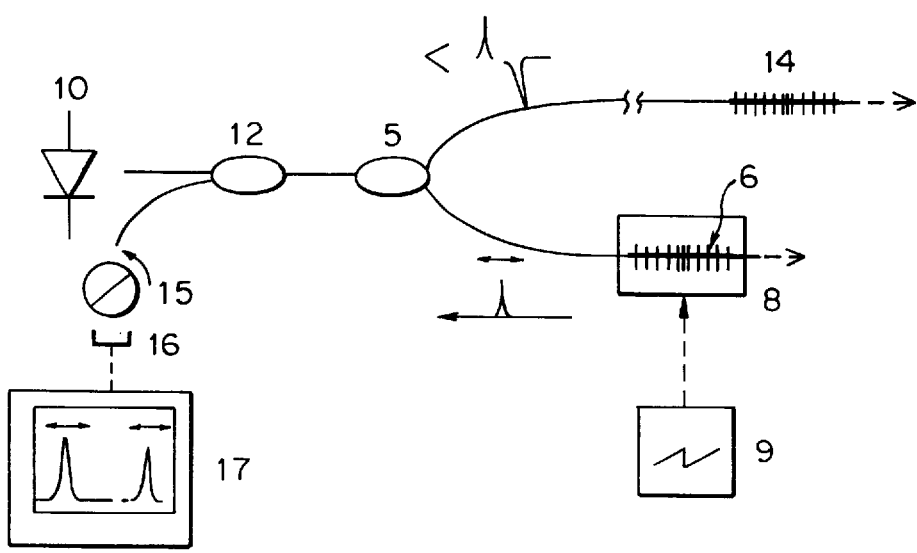
Figure 4A:
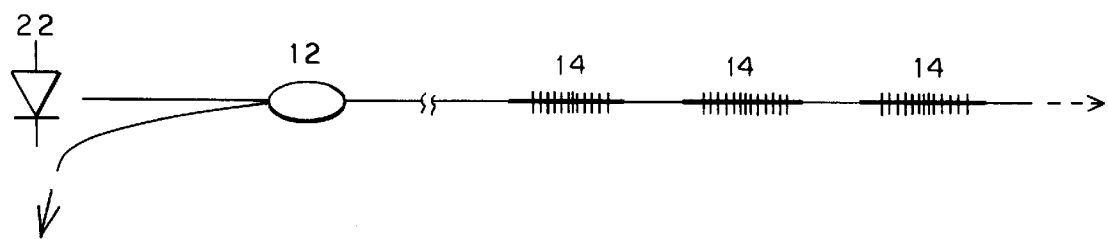
Figure 4B:
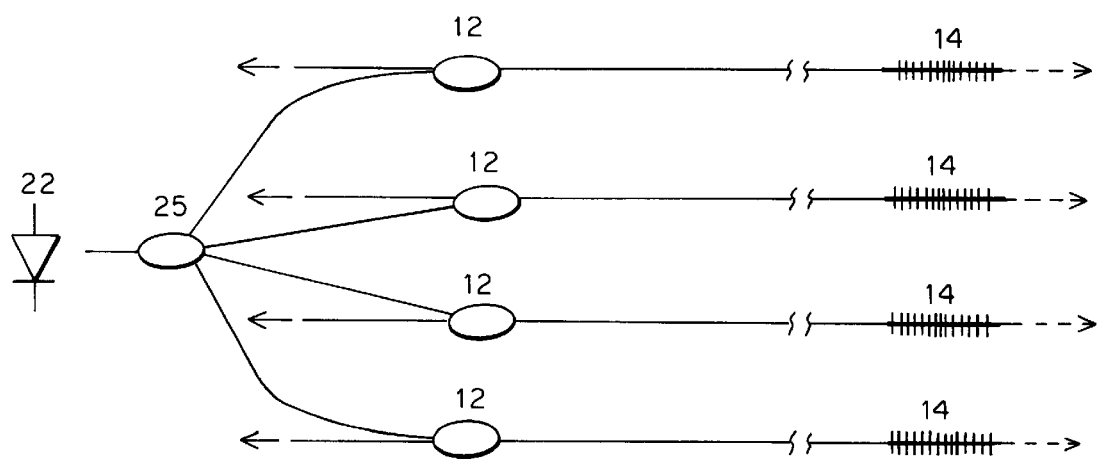
Figure 5:
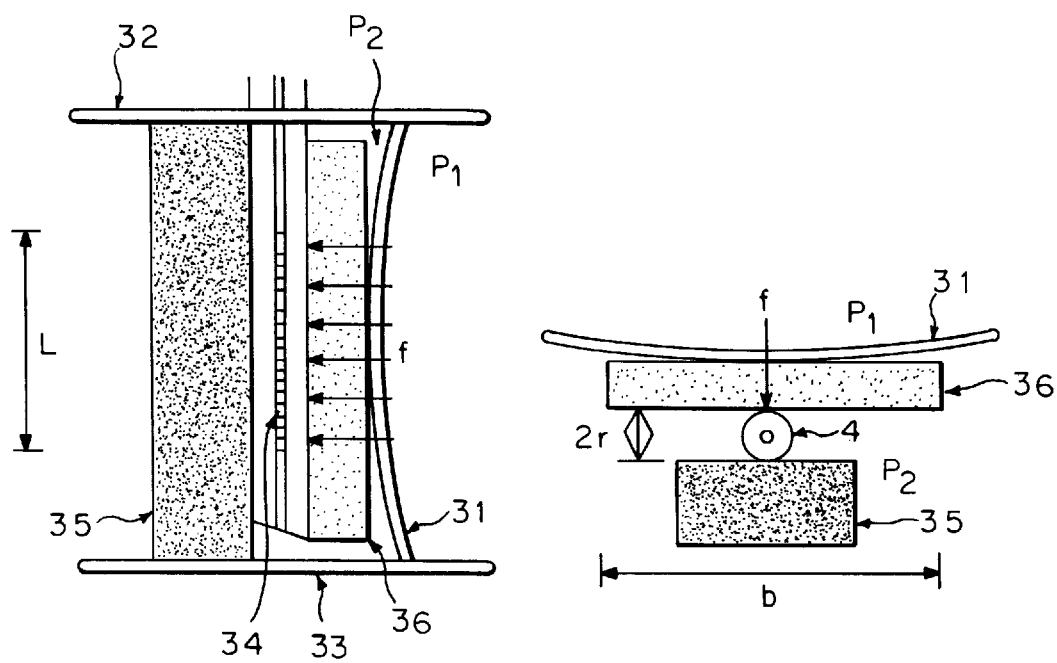

FIG. 2a shows schematically a sensor system with a method for reading the wavelength separation $\Delta\lambda$, FIG. 2b shows the connection between optical spectrum and electrical beat-spectrum, FIG. 3a shows schematically a method of reading both the wavelength separation $\Delta\lambda$ and the absolute value of one of the Bragg-wavelengths, FIG. 3b shows schematically a method for reading both Bragg-wavelengths, FIG. 4a shows schematically how several DFB-lasers may be arranged in series to achieve multiplexing, FIG. 4b shows schematically how several DFB-lasers may be arranged in parallel to achieve multiplexing, FIG. 5 shows schematically a method for measuring the differential pressure using a tuneable double wavelength laser.

DETAILED DESCRIPTION OF THE INVENTION

Figure 1A:
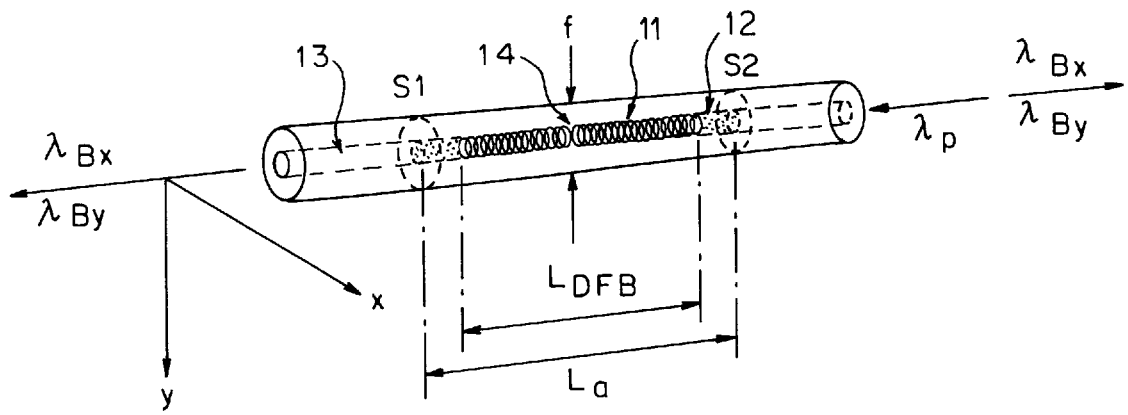
FIG. 1a shows a section of a DFB laser on which a transverse force is applied.

FIG. 1a shows a fiber DFB laser with the length $L_{DFB}$, which is the length of the fiber Bragg-grating 1 engraved into the core of the active fibre with a length $L_a$, which is a single mode optical fibre doped with one or more rare earths 2. This fibre is in the preferred embodiment welded to a single mode optical communication fibre 3 with connections S1 and S2. The fibre Bragg-grating contains at least one phase change 4 to achieve interference on only one wavelength (single frequency operation) in each of the orthogonal polarization states of the fibre laser, which at a preferred optical phase change of 90° is equal to the Bragg wavelength of the fibre grating (center wavelength). At optical end-pumping of the DFB fibre laser with a wavelength $\lambda_p$ the laser effect may be obtained at the two wavelengths $\lambda_{Bx}$ and $\lambda_{By}$, provided by the equation 1a) and 1b). It should be noted that the laser is emitting in both directions, enabling use as a sensor, for reflection and transmission as well.

The wavelength separation is proportional to the birefringence B $(n_x-n_y)$ when $(n_x<n_y)$, wherein $n_x$ and $n_y$ are the effective refractive indices of the fibre laser along the so called rapid and slow polarization axis, respectively x and y axis in FIG. 1a. The wavelength separation can by tuned be changing the birefringence (or the length of the fibre), see equation 3). By pressuring the fibre in the y-direction with a force per unit length, f, a positive birefringence $B_f$ is induced, which for a uniform fibre equals:

$$B_f = \frac{4Cf}{\pi r} \qquad (4)$$

in which r is the fibre radius and C is the optical coefficient of stretch. The force should be enacted along one of the polarization axes of the fibre laser (y-axis in FIG. 1a).

Figure 1B:
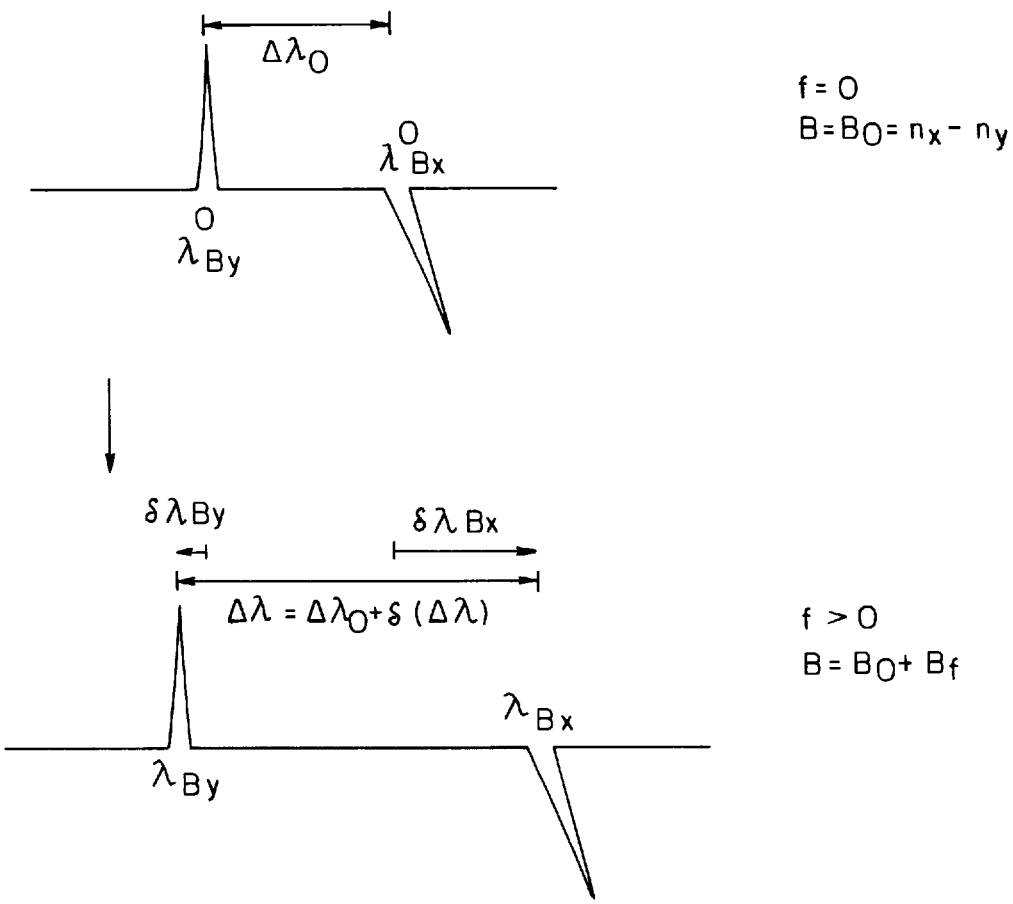
FIG. 1b shows the effect of this force on the optical spectrum of the laser.

The change of the optical spectrum due to a force per unit length, f, on the DFB fibre laser is shown in FIG. 1b. The birefringence is changed from $B_0$ to $B_0+B_f$, which results in the change of $\lambda°_{By}$ with $\delta\lambda_{By}$, while $\lambda°_{By}$ is changed $+\delta\lambda_{Bx}$, to change $\Delta\lambda_0$ with $\delta(\Delta\lambda)$. It may be shown that $|\delta\lambda_{Bx}|=5.5|\delta\lambda_B|$.

FIG. 2a shows schematically the sensor system with a method for reading the wavelength separation $\Delta\lambda$. Pumped light from a diode laser 10 is transmitted through a wavelength multiplexer 12 via a transmission fibre 13, which may have a length of several kilometers, to the DFB fibre laser sensor 14, in which the received pump power provides an emmittance of light (in both directions) on the wavelengths $\lambda_{Bx}$ and $\lambda_{By}$ with separation $\Delta\lambda$. The reflected laser light is sent through the wavelength multiplexer 12 through a linear polarisator 15 to mix said two wavelengths in a detector 16 and generate an electrical beat signal with a frequency equal to the optical frequency separation of the wavelengths. The polarisator should be able to change the orientation, e.g. by changing between two orientations with difference 45° to provide the beat signal at any time. The beat frequency is measured with an electrical frequency analyzer or frequency counter 17.

FIG. 2b shows the connection between an optical spectrum and an electrical beat spectrum. The orthogonal modes each have an optical line width $\Delta v_0$, while the frequency distance between the modes, $\Delta v$, is equal to $c\Delta\lambda/\lambda^2$, in which c is the velocity of light in vacuum and $\lambda$ is the average laser wavelength. The electrical beat spectrum has a center frequency equal to $\Delta v$ and a bandwidth $\Delta v_{beat}$ which is less than or equal to $2\Delta v_0$.

FIG. 3a shows schematically a method for reading both the wavelength separation $\Delta\lambda$ and the absolute value of one for the Bragg wavelengths. In FIG. 3a pumped light is also sent from a diode laser 10 through a wavelength multiplexer 12 to a sensor 13. The reflected laser light is split by a 1×2 coupler 5, in which a part is used to measure $\Delta\lambda$ by sending laser light through a linear polarizer 15, mixing said two wavelengths in a detector 16 and generating an electrical beat signal with a frequency equal to the optical frequency separation between the wavelengths, which is measured by an electrical frequency analyzer 7. The second part of the laser light is transmitted trough a tunable, polarization independent optical transmission filter 8, into a detector 9. The filter is scanned i wavelength or locked to one of the laser wavelengths $\Delta_{Bx}$ or $\lambda_{By}$ by a feed back loop 10.

FIG. 3b shows an alternative heterdoyne demodulation technic, by which the light from the pumped laser 1 is transferred through a wavelength multiplexer 2 and is split by a 1×2 coupler 3 for additionally pumping the sensor laser 4 and also to pump a reference laser 5, which is provided to operate in one wavelength. The light from the reference laser 5 is mixed with the light from the sensor laser 4 in a detector, also with a polarizer 7 and by adjusting the reference laser continuously over a wavelength range covering the dynamic range of the sensor laser wavelength. The reference laser can be tuned e.g. by stretching the grating with a pizoelectrical fibre stretcher 8 operated by a ramp signal from a signal generator 9. The beat frequency provided between the reference laser wavelength and the two wavelengths $\lambda_{BX}$ and $\lambda_{BY}$ of the sensorlaser is measured with a frequency analyzer 10 and by knowing the wavelength of the reference laser as a function of the fibre stretch, $\lambda_{BX}$ and $\lambda_{BY}$ may be determined with great accuracy due to the narrow line width of the fibre lasers. A DFB fibre laser sensor in which only one of the two polarization modes is lasing, may be designed e.g. the fiber stretch, temperature or hydrostatic pressure. Such a narrowband single polarization mode DFB fiber laser could be used for detection of acoustically induced pressure variations using, for example, an interferometer to convert the pressure induced laser wavelength variations into measurable intensity variations at the output of the interferometer. A laser of this kind may also be used as sensor, by measuring one of the emitted wavelengths as a measure for example the fibre stretch.

More DFB fibre laser sensors 1 (or sources) can be multiplexed in series along one fibre, as shown in FIG. 4a, or parallel in different fibres as shown in FIG. 4b. In both cases, the lasers can be pump type with only one pump source 22, wherein the pump light is introduced into the fibre lasers via wavelength multiplexers 12. In FIG. 4b the pump light is split between the different lasers by a 1×N fibre coupler 25, in which N is the number of parallel fibres. The configuration of FIGS. 4a and 4b can be combined. With DFB fibre lasers in series (FIG. 4a) it is important that the wavelength of the different lasers never overlap. The laser light may be uncoupled in both directions.

A lateral force along one of the polarization axes of the fibre will induce a birefringence. FIG. 5 shows schematically a method in which the tunable laser which produces two wavelengths is used for the measurement of differential pressure $\Delta P=P_1-P_2$. This is of importance, e.g. for flow measurements. $P_1$ and $P_1$ are hydrostatic pressures on different sides of a membrane 1 which is suspended between two walls 32 and 33. The fibre laser 34 with length L is arranged on one side of the membrane 31, and pinched between the membrane 31 and a fixed bar/disk 35 which is attached to the walls 32 and 33. This introduces a transverse force on the fiberlaser 34 which ideally is proportional to $\Delta P$. To achieve a uniform force per unit of length f along the total fibrelaser, a movable disk 36 with a length greater than L and width b is arranged between the membrane 31 and the fibrelaser 4. Alternatively the disk 6 is attached to the membrane 1. It may be assumed that $f=kb\Delta P$, in which k is a pressure-to-force transfer constant. The membrane 31 is assumed to have a stress in its non-activated condition ($\Delta P=0$) which provides birefringence $B_0$ in the fibre laser, and that the differential pressure provides birefringence $B_f$ with the same axes as $B_0$, wherein $B_f$ is given by the equation (4).

The sensitivity of the sensor, S, is defined as shift in the beat frequency $\delta(\Delta v)$ per change in the differential pressure, $\delta(\Delta P)$, and may be expressed as:

$$S = \frac{\delta(\Delta v)}{\delta(\Delta P)} = \frac{c}{n\lambda} \frac{4kbC}{\pi r}$$

wherein n and $\lambda$ are average indices of birefringence and laser wavelength. For k=1, 2r=125 $\mu$, C=3,11*10$^{12}$m$^2$/N and $\lambda$=1,55 $\mu$m, the sensitivity S will typically be 1–10 MHZ/mbar for b=1–10 mm. The differential pressure resolution of the sensor $2\Delta V_{beat}/S$, with the unit mbar. With a typical beat bandwidth $\Delta V_{beat}$<100 kHz, and b=10 mm, the resolution will be better than 0,01 mbar. This will also be the resolution at a measurement of absolute pressure $P_2$ when $P_1$ is known.

I claim:

1. A method for application of a fiber-optic distributed feedback (DFB) fiber laser with distributed feedback via one single fiber Bragg-grating along the whole laser length with at least one phase-shift in the core of an optical fiber doped with at least one rare-earths, which operates robustly without mode hopping, at two orthogonally polarized fundamental laser modes which have different wavelengths $\lambda_{Bx}$ and $\lambda_{By}$, as a fiber-optic sensor, for the measurement of an externally applied parameter;

said method comprising the steps of:
propagating light through the DFB laser to cause interaction with the Bragg-grating;
exposing the Bragg-grating to an external parameter causing alternation of the wavelength $\lambda_{Bx}$ and $\lambda_{By}$, and
determining the difference between the altered wavelengths, said difference being a measure of the external parameter.

2. The method of claim 1, wherein said external parameter is produced by the application of pressure.

3. The method according to claim 1, wherein the core of the DFB laser is used as a sensor and operated at laser wavelength $\lambda_{Bx}$ and $\lambda_{By}$ which are orthogonal, exposing to an asymmetrical transverse force, introducing an asymmetrical stress distribution in the core and therefore a birefringence in the fiber with a corresponding differential change in the wavelengths of the two orthogonal laser modes and therefore also a change in wavelength separation between the two orthogonal laser modes.

4. The method of claim 1, wherein said external parameter is produced by the application of differential pressure.

5. The method according to claim 4, wherein the parameter to be measured, such as differential pressure, induces an asymmetrical stress distribution in the fiber core of the dual-polarization mode DFB fiber laser, and therefore a birefringence in the fiber with a corresponding differential change in the wavelengths of the two orthogonal laser modes and therefore also a measurable change in wavelength separation between the two orthogonal laser modes.

6. The method according to claim 4, wherein the parameter to be measured, such as acoustic pressure variations, induces changes in the refractive index or grating period seen by the laser mode in a single-polarization mode DFB fiber laser, and therefore also a measurable change in wavelength of the laser mode.

7. The method of claim 1, wherein said external perturbation is produced by increasing the temperature.

8. A method for application of a fiber-optic distributed feedback via one single fiber Bragg-grating along the whole laser length with at least one phase-shift in the core of an optical fiber doped with at least one rare-earths, which operates as a fiber-optic sensor for the measurement of an externally applied parameter;

said method comprising the steps of:
propagating light through the DFB laser to cause normal operation without mode hopping at first and second polarized laser modes with first and second wavelength $\lambda_{Bx}$ and $\lambda_{By}$;
applying differential gain to suppress the second of the laser modes and thus the second wavelengths;
exposing the Bragg-grating to an external parameter causing a change in the first wavelength, and determining the difference between the first wavelength and the first changed wavelength, said difference being a measure of the externally applied parameter.

9. The method of claim 8, wherein said external parameter is produced by an increase in temperature.

10. A system for measuring at least one externally applied parameter, said system comprising:

a distributed feedback fiber-optic laser (DFB) having a first predetermined length with a fiber Bragg-grating engraved into a core of active fiber, said Bragg-grating having a second predetermined length;

said active fiber being doped with at least one rare earth;

said Bragg-grating including a phase-change means for achieving interference on only one wavelength in each of a pair of orthogonal polarization states;

a source of laser light;

a transmission fiber and means for transmitting laser light through the transmission fiber;

said distributed Bragg-grating responding to the transmitted laser light and emitting light in a first and a second wavelength, the difference between the first and the second wavelength being proportional to the change in birefringence in the active fiber which is caused by the externally applied parameter.

11. The system according to claim 10, wherein the one external parameter is pressure.

12. The system according to claim 10, wherein the one external parameter is temperature.

13. The system according to claim 10, wherein the one external parameter is pressure and a second external parameter corresponding to temperature is applied, the first wavelength being a measure of the temperature.

14. The system according to claim 10, including means for measuring the difference $\Delta\lambda$ between the first wavelength $\lambda_{Bx}$ and the second wavelength $\lambda_{By}$ whereby two parameters are measured, a first parameter being pressure and a second parameter being temperature.

15. The system according to claim 10, including a plurality of sensor elements, said sensor elements being multiplexed in series along one fiber.

16. The system according to claim 10, including a plurality of sensor elements, said sensor elements being multiplexed in parallel.

17. The system of claim 10, for measuring flow in a pipe the differential pressure between two points along the pipe causing a transverse asymmetrical force on the fiber laser core, means for squeezing the fiber between two plates with a force proportional to the differential pressure, and letting the differential pressure be the differential pressure between air channels and the surroundings of a side-hole fiber.

18. The system according to claim 10 for use as a source generating a best signal, which by non-linear propagation in a dispersion-profiled fiber is developed into a pulse train with adjustable frequency of repetition equal the frequency separation between modes of polarization.

19. The system according to claim 10, including a device for transferring a desired external impact to cause a change in the double refraction of the fiber laser, and thus wavelength separation between the orthogonal modes of the laser.

20. The system according to claim 10, wherein the wall pressure of a pipe is introduced as a radial force against the fiber, to measure flow within a pipe.

21. In a measuring system;
   an optical, end-pumped fiber laser with distributed feedback means including a fiber-optic Bragg-grating in a fiber core;
   an amplifying optical fiber being doped with at least one rare earth element;
   said Bragg-grating being arranged on at least a portion of said amplifying optical fiber and including a phase-discontinuity;
   a light source causing lasing of the laser in a first and a second orthogonally polarized mode outputting a first and a second wavelength, and
   means for exposing said Bragg-grating to an external parameter causing birefringence of the laser operation and thus changes in said first and said second wavelength.

22. The measuring system according to claim 21, wherein the external parameter is pressure.

23. The measuring system according to claim 21, wherein the external parameter is temperature.

* * * * *